United States Patent
Rhelimi et al.

(10) Patent No.: US 7,466,821 B2
(45) Date of Patent: Dec. 16, 2008

(54) SECURE ELECTRONIC COMPONENT

(75) Inventors: Alain Rhelimi, Cachan (FR); Ghazi Ben Amor, Paris (FR); Philippe Guignard, Paris (FR)

(73) Assignee: Schlumberger Systemes, Montrouge (FR)

( * ) Notice: Subject to any disclaimer, the term of this patent is extended or adjusted under 35 U.S.C. 154(b) by 626 days.

(21) Appl. No.: 10/472,327

(22) PCT Filed: Mar. 18, 2002

(86) PCT No.: PCT/FR02/00945

§ 371 (c)(1),
(2), (4) Date: Mar. 16, 2004

(87) PCT Pub. No.: WO02/077825

PCT Pub. Date: Oct. 3, 2002

(65) Prior Publication Data

US 2004/0136529 A1    Jul. 15, 2004

(30) Foreign Application Priority Data

Mar. 23, 2001 (FR) .................. 01 04058

(51) Int. Cl.
*H04L 9/00* (2006.01)
(52) U.S. Cl. .................. 380/44; 380/28; 380/30
(58) Field of Classification Search .................. None
See application file for complete search history.

(56) References Cited

U.S. PATENT DOCUMENTS

| | | | |
|---|---|---|---|
| 5,805,712 A | 9/1998 | Davis | 380/50 |
| 5,818,939 A | 10/1998 | Davis | 380/49 |
| 5,963,104 A | 10/1999 | Buer | 331/78 |
| 6,625,297 B1 * | 9/2003 | Bradley | 382/100 |
| 6,965,673 B1 | 11/2005 | Boneh et al. | |

OTHER PUBLICATIONS

M. J. Bellido et al., "A Simple Binary Random Number Generator: New Approaches For CMOS VLSI"; IEEE Circuits and Systems, 1992, Proceedings of the 35th Midwest Symposium on Washington, D.C. USA, Aug. 9-12, 1992; New York, NY; pp. 127-129.

* cited by examiner

*Primary Examiner*—Pramila Parthasarathy
(74) *Attorney, Agent, or Firm*—Osha • Liang LLP (57) ABSTRACT

The invention concerns an electronic component designed to implement a secret key cryptographic algorithm of the type comprising a microprocessor and storage units, characterized in that it comprises generating means for generating by themselves said secret key.

14 Claims, 6 Drawing Sheets

SECURE ELECTRONIC COMPONENT

FIELD OF THE INVENTION

The present invention relates to a secure electronic component. The present invention concerns more particularly a component implementing a cryptographic algorithm and a corresponding secret key, said secret key being directly generated by the component itself.

BACKGROUND OF THE INVENTION

There is nowadays a need for components and more precisely secure controllers that are able to encode or decode respectively transmitted or received data, to store said data in a non-directly accessible form or to identify themselves with a public key.

To illustrate these needs for secure components that are able to encode/decode the exchanged or stored data, the problem of pirating electronic copyrights may be mentioned as an example.

Unlike analog contents, a digital content may be easily copied without there existing any difference between the original and the copy. Furthermore, the development of the new communication means such as the Internet, enables to easily and instantaneously share any digital content with any person worldwide, which leads to a wide pirating of rights. The more affected industries by this wide fraud are the software supplier, record producers etc.

This fraud may be avoided by encoding the digital content using a cryptographic algorithm in such a way that only authorised persons having the algorithm and the decoding key at their disposal may access the digital content.

A credit card reader electronic payment terminal provides another example for which secure components that are able to encode/decode the exchanged and stored data are needed. Such a terminal typically comprises a microcontroller made of a calculation unit and a digital memory into which it stores: its applications, its authenticating and certificating parameters, the realized transactions etc.

Modifying the above parameters may involve a potential fraud. For example, a defrauder having access to the microcontroller may illegally download an application that requests the identifying code (PIN) from a smart card owner and that repeats the payment sequence so as to realize a certificated double transaction which as a transaction realized with an authentic pin may not be cancellable. A defrauder may also suppress a transaction or not handle it when it is realized by a determined smart card owner.

In order to protect the access to the microcontroller, electronic payment terminals suppliers have for a long time used devices for detecting the opening of the housing (switch type) where the microcontroller is located and to trigger the erasing of the controller memories if an opening of said housing is detected. The limits of such a securing clearly appear.

There is thus nowadays an increasing need to provide secure microcontrollers that are able to encode or decode respectively the transmitted data or the received data, and to store said data in an encoded form that is not directly accessible.

A first way to realize such components is for example to implant on a single sealed chip the calculation unit (the microprocessor) and the associated memories (RAM, ROM, EPROM, etc.). The defrauding access to these memories may not be made without running a risk of destroying the component and through the use of very sophisticated tools that are unavailable for most of the defrauders. In this case, the encoding algorithms and the corresponding secret keys are essentially used for exchanging data with the outside and for authenticating the exchanged data. The smartcards and in particular the cards of a SIM type for GSM phones use such a solution. A main drawback of this solution is its relatively limited size of memory.

A second way of proceeding is to use a microprocessor and distinct memories connected by a data bus and to store into said memories only informations that have previously been encoded by said microprocessor. In this case, the encoding algorithms and the corresponding secret keys are used not only for the exchange of data with the outside and for the authenticating of the exchanged data, but also for encoding the data in memory. This solution has the advantage that it allows to use standard memories with large sizes.

In all cases it appears to be necessary to have available at least an encoding algorithm and a secret encoding key in the chip comprising the microprocessor.

Indeed, the encoding algorithms that are used essentially of two types: symmetric or asymmetric, all require secret keys. Whereas the symmetric algorithms such as DES (Data Encryption Standard) use a single and same secret key for encoding and decoding the messages, the asymmetric algorithms use distinct keys for encoding and decoding.

A microprocessor executing an asymmetric algorithm hence has available a pair of keys, said pair being obtained from a secret key in such a way that the decoding key may not be deduced from the encoding key. The encoding key is published, i.e. it is made freely available by an appropriate control authority whereas the decoding key is kept secret in the module. Any person having access to the public key may encode a message intended to the module but only the module is able to decode the message by the use of its secret key.

An example of asymmetric algorithm is the RSA algorithm that is named after its inventors Rivest, Shamir and Adleman.

While the symmetric algorithms (DES etc.) are particularly adapted for encoding data to be stored in an external memory that may be accessed by the microprocessor only, the asymmetric algorithms (RSA etc . . . ) are particularly adapted for exchanging messages with the outside because they have the advantage that they do not communicate the decoding key which remains secret in the module. The only thing that the module has to communicate is the public key.

Typically, the implanting of the secret(s) key(s) in a secure component is performed during the production process of the component in an operation called component customisation.

Each secret key is either engraved in the chip, stored in an intern flash memory that may not be accessed from the outside without destroying the electronic component. This operation is called component customisation. The customisation operation is performed by a machine comprising a reader/scrambler into which the customisation data are downloaded and that may run autonomously due to a microprocessor.

The customisation data of the component and in particular the secret key is provided to the reader/scrambler by a peripheral device via a communication bus associated to a control device.

This customisation is relatively complex. In order to consider the security aspects, it is necessary to insure additional functions such as:

the calculating of transportation type keys for unlocking the component before the customisation operation;
the calculating of a session key for the securing of the data to be introduced in the card; and
the calculating of a certificate which authorises the creating of a directory or a file.

Furthermore, such a customisation operation requires designing a high security infrastructure in the component factory. The customisation also slows down the production cycle duration of the components since it has to be individually performed on each chip. Furthermore, if a key has to be stored into a flash memory, the customisation forces the component manufacturer to add such a flash memory into his component, which requires an additional treatment if the chip did not required a flash memory originally.

Hence the present invention aims at overcoming the drawbacks of this prior art by providing an electronic component that is able to generate by itself the secret keys that are necessary for the executing of the cryptographic algorithm that it will host.

SUMMARY OF THE INVENTION

The electronic component according to the invention aims to implement a cryptographic algorithm with a secret key; it comprises a microprocessor and memories.

According to the invention, the secure electronic component is characterised in that it comprises generating means that allow to generate the secret key by themselves.

According to an other characteristic of the secure electronic component object of the present invention, the secret key generating means comprise random number generating means that allow to pick a random number and a permanent memory that enables to store this random number.

According to an other characteristic of the secure electronic component of the present invention, said secret key generating means comprise oscillating means, the frequency of which depends on the production process and hence is not a priori predictable, comparing means that allows to compare these frequencies. The comparing of the frequencies of these oscillators allows to determine a secret key.

According to an other characteristic of the secure electronic component of the present invention, the secret key generating means comprise measuring means to measure appropriate physical parameters cooperating with all or with a part of the electronic circuits of the component, and processing means for the values measured in this way so as to obtain the secret key, these circuits and these measured physical parameters being chosen so as to provide distinct and random values from one component to the other because of the natural dispersion underlying the production of the circuit.

According to an other characteristic of the secure electronic component object of the present invention, the component comprises a specific electronic circuit that cooperates with the measuring means, this electronic circuit being constituted mainly based on transistors.

According to an other characteristic of the secure electronic component object of the present invention, the circuit that is used as a support to the secret key generating means is formed by a series of pair of invertors that are mounted in opposition, wherein the measured physical values are the voltages at the input of one of the two invertors of each of said pairs.

According to an other characteristic of the secure electronic component object of the present invention, each one of the invertors of each one of said pairs possesses specific characteristics that are rendered random by a very dispersive production process.

According to an other characteristic of the secure electronic component object of the present invention, the non-homogeneity of the invertors concerns more particularly the charging current and/or the relative capacity of the input and output.

According to an other characteristic of the secure electronic component object of the present invention, the component comprises encoding/decoding means that cooperate with an external memory.

According to an other characteristic of the secure electronic component object of the present invention, the encoding/decoding means are formed by a specific microcircuit that is realized with a hardwired logic.

According to an other characteristic of the secure electronic component object of the present invention, the secret key cooperates with appropriate calculating means so as to generate the public and secret keys of an asymmetric cryptographic algorithm.

According to an other characteristic of the secure electronic component object of the present invention, the public key is communicated to a control authority so that the component may authenticate itself and integrate itself in a secure data of PKI type exchange device.

According to an other characteristic of the secure electronic component object of the present invention, the component is implemented as a chip.

Other characteristics and advantages of the present invention will appear more clearly when reading the following description of the embodiments of the invention that are given as non-limitative examples.

DETAILED DESCRIPTION

Only the elements that are essential for understanding the present invention have been represented on the drawings. In order to render the reading easier, the same elements have the same references from one figure to the other.

Figure 1:
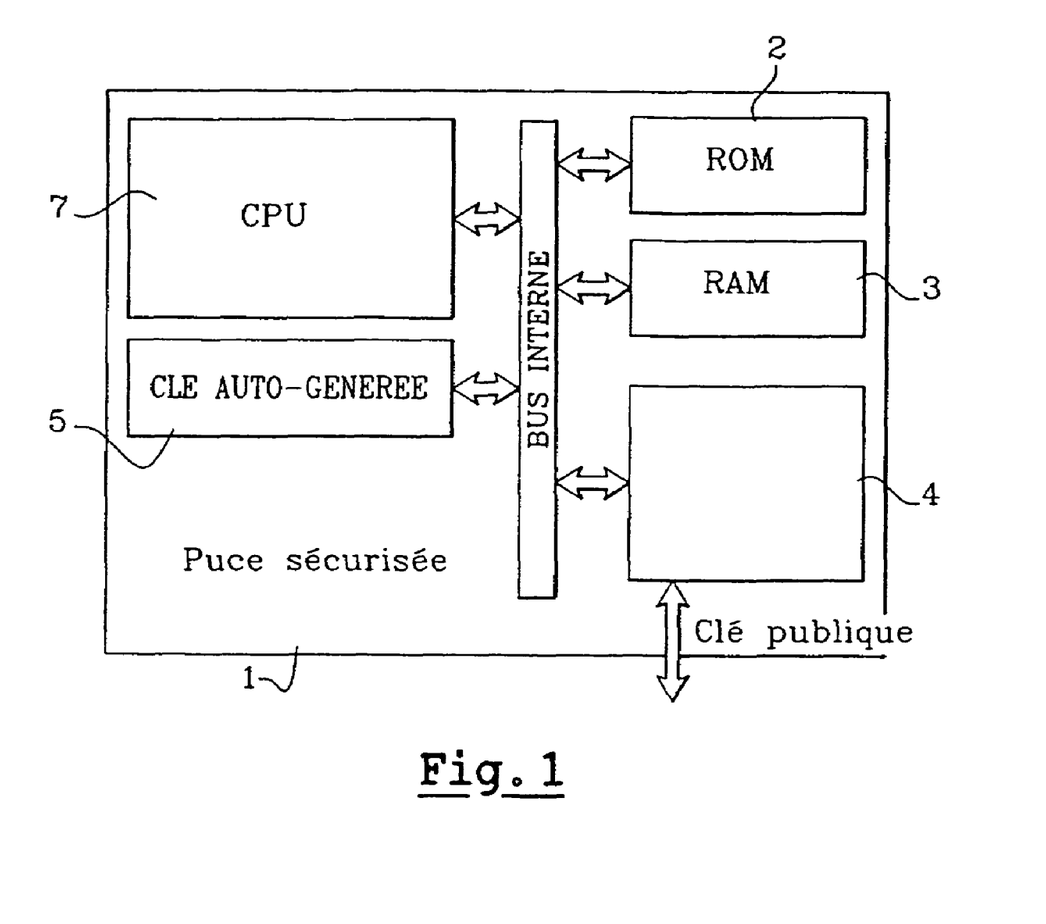
FIG. 1 is a simplified view presenting a secure component according to the invention.

Referring to FIG. 1, an electronic component according to the invention is schematically represented. This component is thus adapted to implement a secret key cryptographic algorithm.

The component referenced as 1 comprises, in the form of an integrated circuit in a silicon chip, a microprocessor CPU 7, a non-volatile program memory ROM 2 (Read Only Memory), a volatile working memory RAM 3 (Random Access Memory). In order to be able to use the one or many encoding algorithm(s) that may be symmetric and/or asymmetric, stored in the program memory 2, the component 1 also comprises generating means 5 for generating a number that makes the secret key IK (Initial Key).

Figure 5:
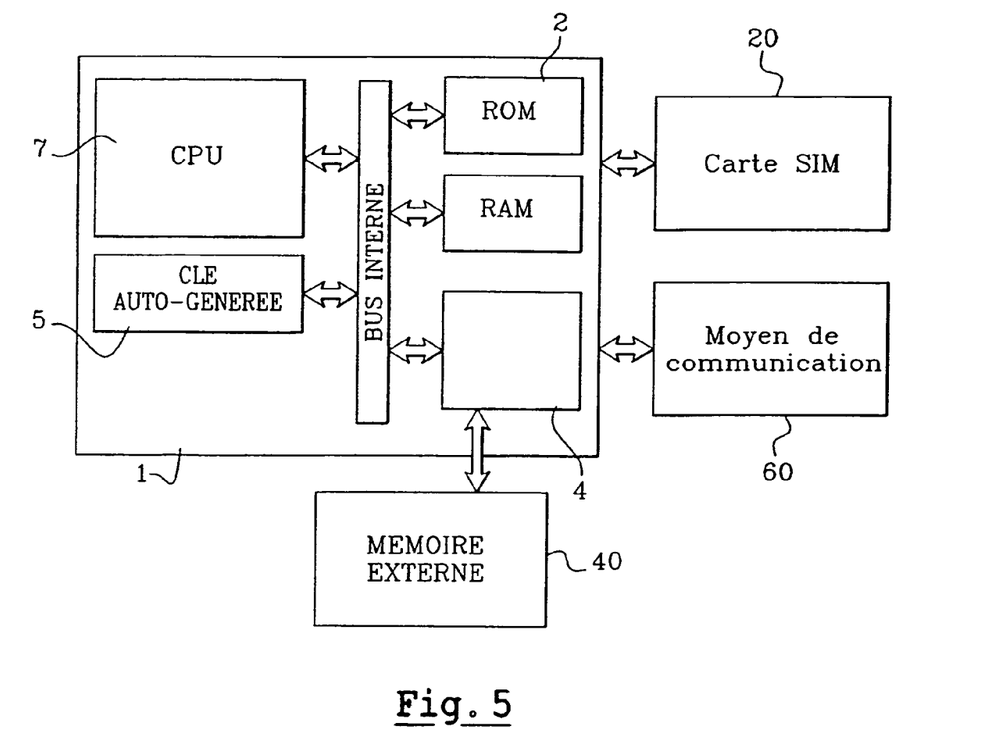
FIG. 5 details the use of a secure component according to the invention in a mobile phone.

Furthermore, in the illustrated example wherein the component is intended to cooperate for reading/writing with an extern memory of an EEPROM type 40 (Electrically Erasable programmable Read Only Memory), see FIG. 5, via a non-represented communication bus, the component also comprises encoding/decoding means 4 for encoding/decoding respectively the emitted/received data of the memory 40 by using a symmetric algorithm of DES type and the key IK. The use of such means 4 realized in a hardwired logic form dedicated to the encoding/decoding of the communication bus to the memory 40 authorises high data transfer speeds.

Such a traditionally vulnerable external memory 40 is then encoded by the component 1 that is the only one to possess the encoding key. The system that is constituted by the encoding component 1 and his external memory 40 hence forms an autonomous entity that is perfectly secured.

The key is systematically used for encoding the critical informations during a writing into a memory and for decoding during a reading. The encoding result is a function of the encoding key, of the data and of its memory address. The address or the complement with a random number must indeed be used for avoiding the substituting attacks.

For all the cases, the key must not be accessible. For this reason it is not accessible through the memory bus.

Such a component 1 may be used in any apparatus that requires a securing of the data exchanges and of the data storage such as for example and in a non-limitative way the payment terminals, the mobile phones etc.

According to the invention the component 1 comprises means 5 that are able to generate in a non-predictable way, i.e., a priori in a perfectly random way, a single number IK that is intended to be used, during the life time of the component 1, as a secret key for the different encoding algorithms that are implemented by said component 1 whether they are symmetric (like DIS) or asymmetric (like RSA). In this latter case, the key IK is used to produce the pair of secret Ks and public Kp keys.

According to a first approach, this number IK may be directly generated by using random number generating means. It should be noted that such means are frequently used by the encoding algorithms. It is sufficient to specifically solicit these random number generating means, for example during an initial command, to generate a random number IK and to store this number IK a permanent flash memory of the component 1.

According to a second approach, this number IK may be tied more intimately to the structure itself of the component 1. The invention may then be found in the possibility to identify, despite an identical production mask for all components, specificities that are specific to each component and to obtain a secret key IK therefrom for each component.

These specificities that are used for the elaborating of the secret key IK mainly result from the production process and more precisely from the dispersions of the production that causes no component to be really identical to the other.

Figure 2:
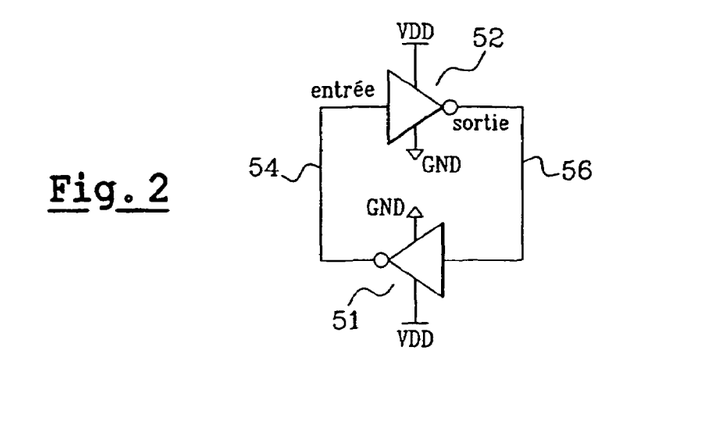
FIG. 2 is a partial schematic view of the encoding key generating circuit according to an embodiment of the present invention.
Figure 3:
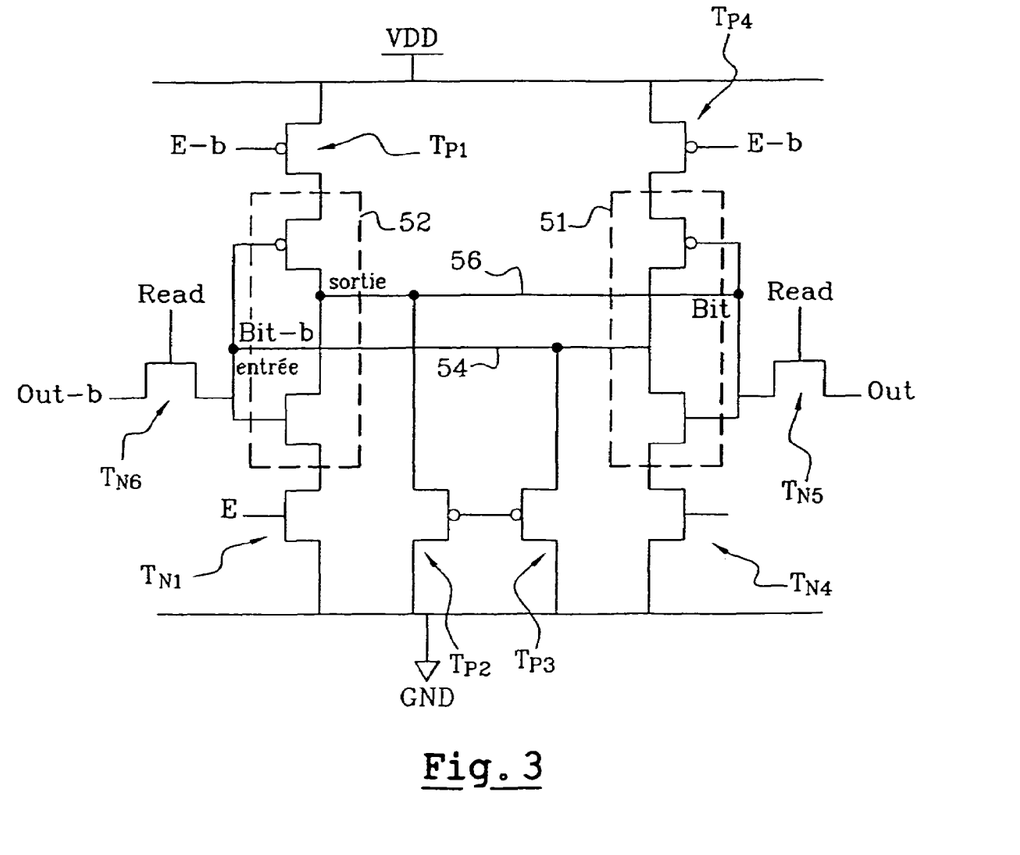
FIG. 3 is a detailed representation of the circuit shown in FIG. 2.
Figure 4:
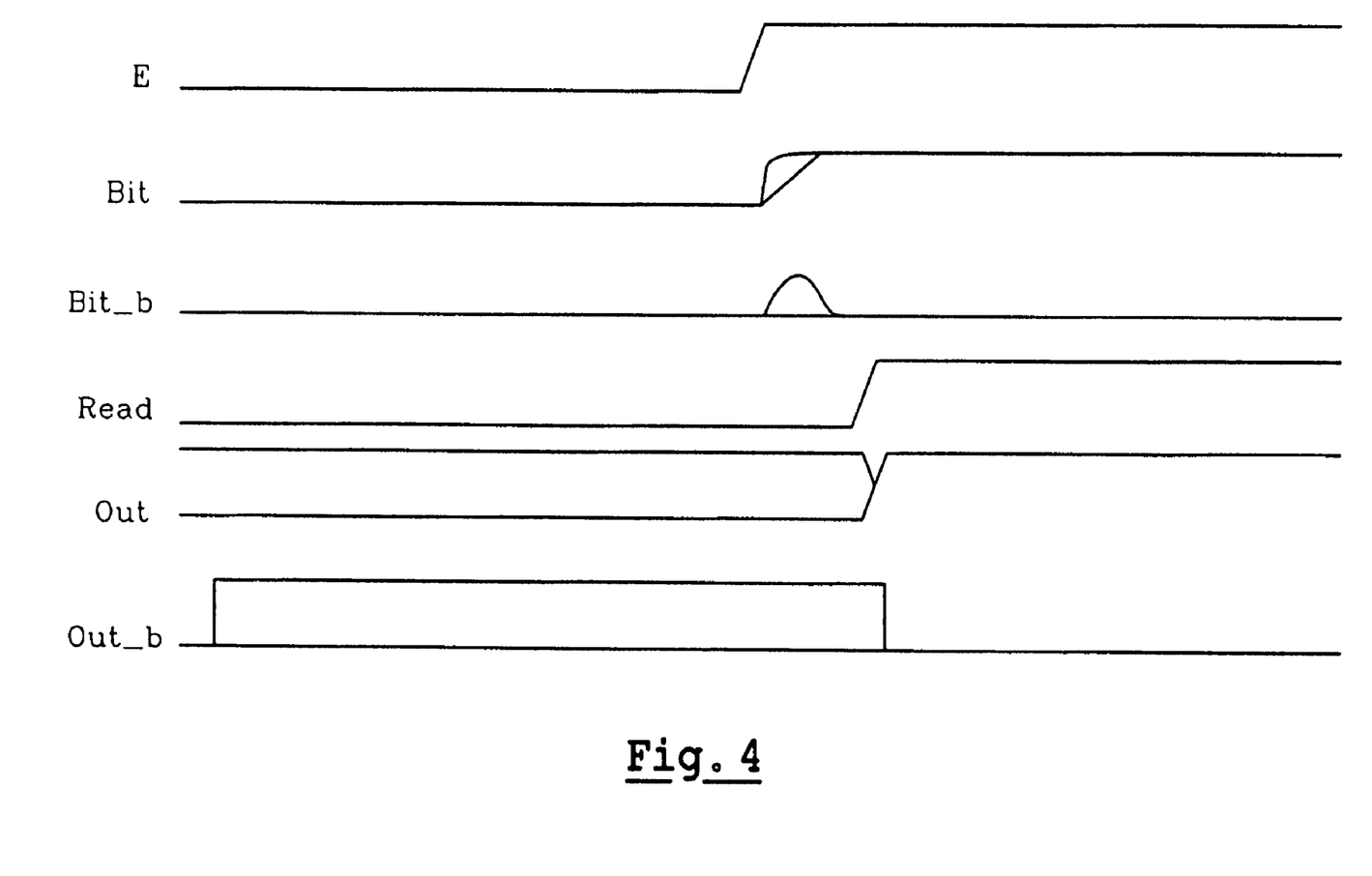
FIG. 4 details the operation of the circuit shown in FIG. 3 using various time diagrams.

Referring to FIGS. 2 to 4, the description of a particular embodiment will render this second approach easier to understand.

Let us consider a secret key IK, the size of which may for example be of 1024 bits.

This key is then generated by a microcircuit that is realized essentially based on MOS transistors gathered in a form of a series of couples of invertors mounted in opposition (tete-beche). Each couple of invertors defines the value as "1" or as "0" of a bit of the key. For example the couple 51,52 that is represented in FIG. 2 represents the $n^{th}$ bit of the key IK wherein n belongs to the interval [0; 1023].

An inverter is formed by serially mounting a NMOS transistor and a PMOS transistor, the first being connected at the ground GND by its source, wherein GND represents the logic stage "0", the second being connected to the power supply +VDD by its source, +VDD representing the logic state "1". The gates of the two transistors are connected and define the input of the inverter whereas the output of the inverter is defined by the junction of the two drains of the transistors. An NMOS transistor is "on" when its gate is at "1" whereas a PMOS transistor is "on" when its gate is at "0". As a result, when the input of the inverter 51 is "0", its output is at "1" and vice versa.

When two invertors set in opposition, according to the scheme of FIG. 2, and a voltage supply (+VDD) is applied to each one of the two invertors 51 and 52, then the potentials at the output of the invertors 51 and 52 rapidly switch to GND for the one and to +VDD for the other in such a way that a stable state is established in each of the two branches 54 and 56, a state that is respectively "0" and "1" or the inverse "1" and "0".

The fact that the invertors switch to a potential or another is a function of the departing potential (charges on the mesh) on the relative strength of the invertors, i.e., of the charging current (w/l ratio: width/length of the channel of a MOSFET transistor) and on the relative capacity of the inputs and the outputs.

With such an assembly, the value that is obtained at an output of the two invertors 51 and 52, "0" or "1" hence depends of their respective characteristics and may not be determined a priori. Thus, departing with an equal potential at both inputs, the final potential at the outputs of the invertors is a random data that depends only on the dispersions of the production process. It is sufficient to consider the output value of one of the two invertors as the value of the $n^{th}$ bit of the IK key. It therefore appears clearly that with such a circuit it is possible to pick a perfectly random IK key.

Referring to FIG. 3, a possible embodiment of the schematic assembly of FIG. 2 is given. The two invertors 51 and 52 are connected respectively to the ground GND and to the voltage +VDD by a series of NMOS transistors: TN1 and TN4 and by PMOS transistors: TP1 and TP4. By applying a signal E (from the English Enable) equal to "0" on the gates of the transistors TN1, TN4 and a signal E_b equal to "1" on the gates of the transistors TP1 and TP4, the input signals of the invertors 51 and 52 are reset and the invertors are deactivated. Furthermore, the connections 54 and 56 are connected to the ground GND by means of PMOS transistors respectively TP3 and TP2 driven by the signal E applied to their gate. Hence when the signal E is equal to "0", the voltage value respectively BIT and BIT_b of the two branches 56 and 54 and thus the inputs of the two invertors 52 and 51 are drawn back to "0".

The values BIT and BIT_b of the branches 54 and 56 respectively OUT and OUT_b are read using NMOS transistors respectively TN6 and TN5 driven by a READ signal that supplies their respective gate. The use of the two transistors TN5 and TN6 allows to keep the symmetry of the assembly and thus not to privilege an inverter compared to the other because of a difference of capacities.

The reading process of the value of the $n^{th}$ bit of the IK key, defined for example by the value of the signal OUT, is detailed on FIG. 4. The signal E (Enable) is switched to the value "1" to give the reading command. When E is high, the PMOS TP2 and TP3 joining the inputs of the invertors to GND are deactivated; the NMOS TN1, TN4 and the PMOS TP1 and TP4 are activated, and hence the invertors 51 and 52 are activated. The stronger inverter among the two, here the inverter 52, causes its input potential to switch to "1" (+VDD) and hence its output potential to "0" (GND). Once the potential is stabilized in the lines 54 and 56, the reading of the value of the signal out ("0" or "1") may be performed by raising the potential of the READ signal to "1". Hence in this case the $n^{th}$ bit on the IK key value is "1".

This process may be perfectly repeated, and allows the component to permanently have at his disposal his IK key without any need of a flash memory to store it.

Hence the invention may be found in the possibility to have available in the pairs of invertors, an inverter stronger than the other so as to always provide the same voltage balance during the reading phase, while rendering the choice of the stronger inverter in the pair a priori random. This is rendered possible solely by the production process of such a circuit.

The production process of such a circuit is based on the engraving of transistor in a silicon layer. As described above, the fact for an inverter to switch to a potential or the other, is a function of the departing potential (charges on the mesh), the charging current of each inverter (choice of the dimensions W/L width/length of the channel of a MOSFET transistor) and the relative capacity of the input and output. The differentiation of the invertors may be realized by modifying the charging current parameters and output capacities, by generating errors due to the positioning of the mask and/or the purity or the doping of the substrate and/or to the dispersion of the dopers and/or to the proximity of the MOSFET on the silicon (assembly symmetry) etc.

Steps for the production process may be easily taken so as to increase the variances between the invertors. This may be performed by amplifying some parameters that work against the transistor homogeneity. Among these parameters the following parameters may be mentioned:
  the substrate effect (gamma) that directly acts on the
    threshold voltage Vt and hence on a early conducting of
    the transistor, because it injects charges in the channel;
  the conducting beneath the threshold: i.e., there is a conduction (which was not foreseen) or inversely the MOS
    is off:
    First case favourable to this parasitic conduction: MOS
      with a less doped substrate;
    Second case: MOS with a short channel.
  The effect of the hot carriers: they imply a rise of Vt. This
    may be applied mainly to the short channel (small L);
  The production process: a production method of the MOS
    consists in depositing the oxide then the gate (aluminium or polysilicium) and then to dope the substrate
    (for example zone N for an NMOS). This allows to
    provide, importantly, a very good symmetry of the doping relative to the gate and hence controlled characteristics for the transistor. On the contrary, if the substrate is
    doped and if the gate is deposited afterward, the symmetries are not controlled. The overlapping zones
    between the gate and the doped zones are then a function
    of the dispersions that are due to the involved technology
    (e.g. photolithography). In this case, the variation of the
    overlapping capacities and the variation of the width of
    the transistor (L) modify the thresholds voltage Vt.

These different methods allow to increase the variance of the strength of the invertors, they may as such be used each separately or in combination.

It should be noted that the difference between invertors should be important enough for the final result to be repeatable and not easily disturbable by possible parasites. Indeed, when the characteristics of the invertors are too similar, the obtained result after a reading may vary with time. Furthermore, in order to avoid any disturbing of the reading by parasites from the power supply (+VDD), the power supply must be correctly filtered (bandgap).

In order to prevent the realization of a couple of investors that are not sufficiently differentiated, if the production process may not always guarantee this differentiation for every case, an alternative embodiment may be considered by providing a number of couples of invertors that is higher than the number of bits necessary to form the secret IK key, by testing each couple over a predetermined number n (for example n equals 30) of readings and to keep only the couples of invertors that provided a same result for this n readings.

For a reduction to practice of the system, the microcircuit hence comprises a number Q of couples of invertors that is higher than the number P of bits necessary to realize the encoding key, and to choose, after testing them, among those Q couples, P stable couples. The position of the P couples may be scrambled in a non encoded permanent external memory. For further utilization, only the couples corresponding to the scrambled positions in this memory will be read so as to obtain the encoding key.

The microcircuit 5, partially illustrated in FIG. 3, through which is created the IK key, is thus limited at the most to several thousand of transistors. Its cost is hence much smaller than the cost of a customisation step.

Using the IK key generating means 5, it becomes possible to provide a secure storage of the data without having to customize a chip and by using standard commercial memories, thus providing an important reduction of the costs of the function.

Figure 7:
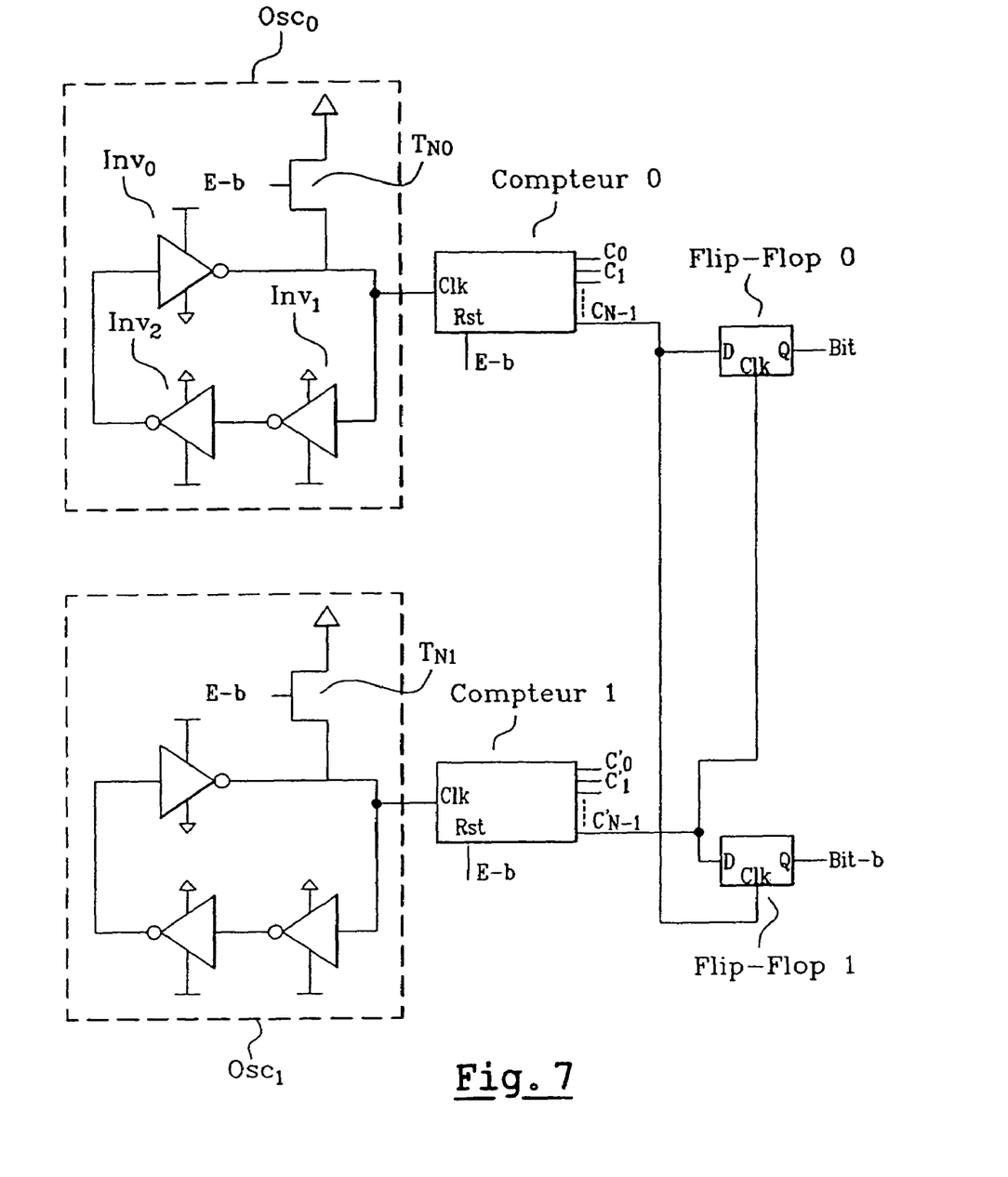
FIG. 7 describes a schematic partial view of the encoding key generating circuit according to an other embodiment of the present invention.

Others generating methods for generating the IK key having the same principle of the dispersion and of the differences between invertors may be considered. FIG. 7 illustrates an example of such a method. An oscillator may be formed by a succession of an odd number of transistors (three in the figure). The oscillating frequency of this oscillator depends on the strength of the invertors constituting it.

It may be considered to compare the frequency of two oscillators OSC0 and OSC1 for generating a "1" or a "0" according to the results of the comparison. An identical state is imposed to the two oscillators OSC0 and OSC1 using a signal E_b and the transistors TN0 and TN1. The signals E_b is also used to reset to zero the counters counter_0 and counter_1. When E switches to "1", the oscillators begin to oscillate. Each counter is incremented at each oscillation of its associated oscillator. As a consequence, the fastest oscillator will increment its counter faster and hence will be the first to force the signal corresponding to the $n^{th}$ bit of the counter to "1". This faster signal ($C_{n-1}$ or $C'_{n-1}$ depending on whether OSC0 or OSC1 is the fastest) is connected to the input Clk of a flip-flop. It will hence force its output Q to "0" (slowest signal value). Then the slowest signal connected to the input Clk of the other flip-flop will force the Q output of the latter to "1" (fastest signal value). Hence the Bit value will be equal to 1 if OSC0 is faster and to "0" in the opposite case. It is important to have 2 flip flops for symmetry reasons.

In this embodiment the pairs of oscillators OSC0 and OSC1 will be selected depending on their relative gap. The counters associated to these oscillators are read after counting and the extracted values of the counters allow to calculate a ratio R which is the division of the smallest value by the highest value. Only the couples which have a ratio R higher than a predetermined value will be kept for calculating the final secret key. The selected couples may be stored in a non-volatile and non-encoded external memory so as to keep during the booting of the secure component only the couples that have a dispersion high enough for avoiding any disfunction of the process with time. The storage of the selected couples in a non-protected external memory does not provide information on the value of the counters and de facto on the value of the secret key.

FIG. 5 illustrates a use of such a secure component in a terminal such as a mobile phone terminal of GSM type. Of course the uses of such a component are not limited to the mobile phones but concern a wide range of terminals such as in particular the bank card readers, the MP3 walkmans, the public phones, the ticket machines, etc.

A possible use of such a secure component 1 in a mobile phone may be to read musical files of a MP3 format, or to read video files, etc. Because of the size of these files, the access through a memory bus authorises a much higher bandwidth than the bandwidth of the SIM smart card 20 of the phone. It is hence important that the component 1 uses such data. The component 1 is then adapted for exchanging encoded data with the outside and hence possesses an asymmetric cryptographic algorithm of the RSA type and appropriate means for transforming the IK key into a couple of secret key Ks and public key Kp.

The component 1 completes the SIM card 20 which main role it is to enable the owner to keep all his privileges (access to a radio telecommunication network, phone directory, service parameters for services to which the smart card owner has subscribed) when he decides to change his apparatus, he just has to re-use his smartcard 20.

When the user wishes to download musical files to his phone, he connects to an appropriate site by using the communicating means 60 of his phone and the data of his SIM card 20. The SIM card 20 gives to the appropriate site the certificate of the component 1 according to the PKI mechanism (Public Key Infrastructure). The certificate emitted by an appropriate authority, guarantees the authenticity of the component 1 and provides the public key Kp that will be used for encoding the file that is sent from the site to the phone. This file hence will be downloaded in an encoded form to the phone and will be stored in the encoded form in the external memory 40 of the component 1. Only an analog signal will get out of the component 1 when the user listens to said file.

Of course the component 1 and the SIM card 20 exchange between each other their public keys respectively Kp and Kp' during an initialisation step in order to establish information exchange sessions that are totally secured. Any communication between the SIM card 20 and the component 1 may be performed in an encoded way thanks to the public keys Kp and Kp'.

Figure 6:
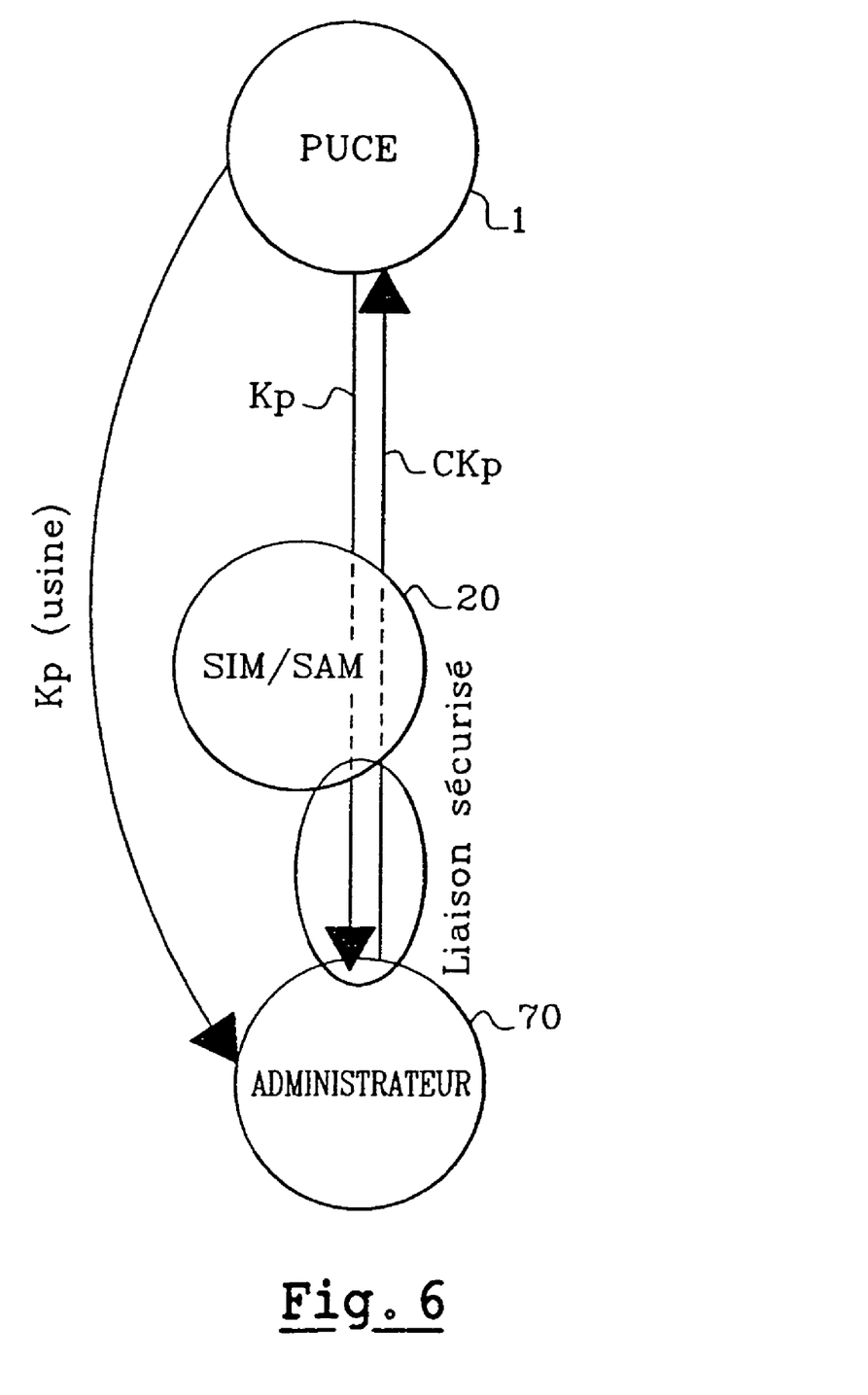
FIG. 6 details a customisation process of a secure component according to the invention.

FIG. 6 illustrates a method for assigning an authenticating certificate to the component 1.

During the production process and at a power supply when the component 1 is turned on, in particular during a test operation at the end of the production line, the component 1 generates its IK key and therefore its pair of secret keys Ks and public key Kp, this latter public key Kp then being read and stored into a secure and appropriate database intended to a certification and control authority 70.

During the first communicating session between the component 1 and a SIM card 20 (for example the day the mobile phone is bought and the SIM card is set), the component 1 transmits its public key Kp to the SIM card 20 that stores it into a flash memory. The SIM card 20 then verifies the authenticity of this key Kp by initiating a secure communication by using each own public key Kp' and its own authentication certificate with the certification authority 70. If effectively the key Kp is referenced by the certificating authority 70, then the certificating authority sends back the corresponding certificate, which is transmitted by the SIM card 20 to the component 1 with its own public key Kp'.

Once the certificate of the public key Kp' of the SIM card 20 is transmitted and stored into the secure memory by the component 1, then the securing of the whole system uses standard principles based on PKI type structures.

Crucial data are secured by the encoding performed by the scrambler 4 of the component 1. Only the component 1 is able to decode its data bus. Never the IK key auto-generated by the component 1 will get out of the component 1. To insure this, the selecting operation of the valid bits of the key and the calculating of the public and secret keys from the auto-generated key are performed in the component from the internal memories ROM 2 and RAM 3.

The public and private keys are used for authenticating the chip and they are stored in an external flash in an encoded form. Only some secure functionalities will have access to the reading of these keys. The access authorisations will be obtained hierarchically starting from the primary "boot", i.e., from the downloading program. The access to this portion of the memory will be directly limited by the MPU (Memory Protection Unit), i.e., by the mechanism of material protection of the access to the memory.

The downloaded software components, e.g., the OS (Operating System), are signed by an authority. The component checks the consistency and the authenticity of these applications thanks to the digital signatures. The principles that are used are classical in cryptography (MD5, SHA, RSA or DES).

The invention claimed is:

1. An electronic component having a microprocessor and memory, the electronic component configured to implement a secret key cryptographic algorithm comprising:
    generating means for generating the secret key directly, said secret generating means comprising,
    measuring means for measuring appropriate physical parameters, the measuring means configured to communicate with at least a portion of a plurality of electronic circuits included in said electronic component,
    processing means for processing the measured physical parameters to obtain said secret key,
    wherein said generating means further comprises oscillating means having at least one frequency dependent on a production process, and
    comparing means for comparing frequencies of the oscillating means,
    wherein the natural dispersion of production of said electronic circuits provides distinct and random values when measuring physical parameters.

2. The electronic component according to claim 1, further comprising encoding/decoding means configured to communicate with an external memory.

3. The electronic component according to claim 2, wherein said encoding/decoding means are formed by a specific microcircuit comprising hardwired logic.

4. The electronic component according to claim 1, wherein said secret key is used with a calculating means to generate a public key and a corresponding secret key for use with an asymmetric cryptographic algorithm.

5. The electronic component according to claim 4, wherein said public key is communicated to a control authority so as to be able to authenticate itself and to integrate itself in a secure data of a PKI type exchange device.

6. The electronic component according to claim 1, further comprising a microcircuit implemented as an electronic chip.

7. An electronic component having a microprocessor and memory, the electronic component configured to implement a secret key cryptographic algorithm comprising:

generating means for generating the secret key directly, said secret key generating means comprising, measuring means for measuring appropriate physical parameters, the measuring means configured to communicate with at least a portion of a plurality of electronic circuits included in said electronic component, and processing means for processing the measured physical parameters to obtain said secret key, wherein the natural dispersion of production of said electronic circuits provides distinct and random values when measuring physical parameters, a specific electronic circuit configured to communicate with said measuring means, said specific electronic circuit comprising a plurality of transistors, wherein said specific electronic circuit is formed by a series of pairs of inverters that are mounted in opposition, and wherein the measured physical parameters indicate voltages at an input of at least one inverter from each pair of inverters.

8. The electronic component according to claim 7, wherein each of said inverters of each of said pairs of inverters possesses specific characteristics that are not homogenous and that are rendered random by a dispersive production process.

9. The electronic component according to claim 8, wherein the specific characteristics that are not homogenous of the inverters comprises at least one selected from the group consisting of: charging current; and relative capacity of inverter input and output.

10. The electronic component according to claim 7, further comprising encoding/decoding means configured to communicate with an external memory.

11. The electronic component according to claim 10, wherein said encoding/decoding means are formed by a specific microcircuit comprising hardwired logic.

12. The electronic component according to claim 7, wherein said secret key is used with a calculating means to generate a public key and a corresponding secret key for use with an asymmetric cryptographic algorithm.

13. The electronic component according to claim 12, wherein said public key is communicated to a control authority so as to be able to authenticate itself and to integrate itself in a secure data of a PKI type exchange device.

14. The electronic component according to claim 7, further comprising a microcircuit implemented as an electronic chip.

* * * * *